US012634347B2

(12) United States Patent
Meyuhas

(10) Patent No.: US 12,634,347 B2
(45) Date of Patent: May 19, 2026

(54) SYSTEMS AND METHODS FOR DETECTING AND REMEDIATING INCONSISTENT TAGS IN CLOUD-NATIVE NETWORKS

(71) Applicant: Zscaler, Inc., San Jose, CA (US)

(72) Inventor: Eden Meyuhas, Holon (IL)

(73) Assignee: Zscaler, Inc., San Jose, CA (US)

( * ) Notice: Subject to any disclaimer, the term of this patent is extended or adjusted under 35 U.S.C. 154(b) by 263 days.

(21) Appl. No.: 18/477,712

(22) Filed: Sep. 29, 2023

(65) Prior Publication Data

US 2025/0112959 A1 Apr. 3, 2025

(51) Int. Cl.
*H04L 9/40* (2022.01)

(52) U.S. Cl.
CPC .............. *H04L 63/20* (2013.01); *H04L 63/10* (2013.01)

(58) Field of Classification Search
CPC .... G06F 16/215; G06F 16/258; G06F 16/285; G06F 16/90344; G06F 18/211; G06F 18/22; G06F 18/232
See application file for complete search history.

(56) References Cited

U.S. PATENT DOCUMENTS

| | | | |
|---|---|---|---|
| 10,409,803 B1 * | 9/2019 | Lai | G06F 16/90335 |
| 10,956,986 B1 * | 3/2021 | Ran | G06F 16/24573 |
| 12,443,574 B1 * | 10/2025 | Kulshreshtha | G06F 16/125 |

| | | | |
|---|---|---|---|
| 2014/0067363 A1 * | 3/2014 | Ogren | G06F 40/16 |
| | | | 704/2 |
| 2017/0063720 A1 * | 3/2017 | Foskett | H04L 67/56 |
| 2017/0091320 A1 * | 3/2017 | Psota | G06F 16/3337 |
| 2019/0102441 A1 * | 4/2019 | Malak | G06F 16/285 |
| 2020/0320709 A1 * | 10/2020 | Geipel | G06F 18/214 |
| 2021/0224258 A1 * | 7/2021 | Faruquie | G06F 16/244 |
| 2021/0232908 A1 * | 7/2021 | Xian | G06N 3/045 |
| 2022/0253594 A1 * | 8/2022 | Potts | G06F 3/04842 |
| 2022/0253871 A1 * | 8/2022 | Miller | G06F 16/36 |
| 2022/0300711 A1 * | 9/2022 | Elisco | G06F 16/93 |
| 2022/0327119 A1 * | 10/2022 | Gasper | G06F 16/9024 |
| 2022/0374399 A1 * | 11/2022 | Kementsietsidis | G06F 16/211 |
| 2023/0131236 A1 * | 4/2023 | Khan | G06Q 10/1053 |
| | | | 705/321 |
| 2023/0153740 A1 * | 5/2023 | Meehan | G06Q 10/06395 |
| | | | 705/7.41 |
| 2023/0315993 A1 * | 10/2023 | Nieborowski | G06F 16/35 |
| | | | 704/9 |
| 2024/0095219 A1 * | 3/2024 | Joyce | G06F 16/215 |

(Continued)

*Primary Examiner* — Greg C Bengzon
(74) *Attorney, Agent, or Firm* — Baratta Law PLLC; Lawrence A. Baratta, Jr.; Ryan Odessa

(57) ABSTRACT

Systems and methods for detecting and remediating inconsistent tags in cloud-native networks include collecting tags from all resources in a cloud environment; converting each of the tags to a desired format and extracting unique tags in the desired format; calculating a similarity score between all of the unique tags in the desired format and creating tag pairs based on the similarity scores; and selecting a suggested tag for each of the tag pairs based on a number of appearances of each of the tags in the tag pairs. In various embodiments the steps can further include identifying a new resource in the cloud environment; and utilizing one or more machine learning models to determine if the new resource has inaccurate tags, and providing tag suggestions based thereon.

14 Claims, 11 Drawing Sheets

1000

(56) References Cited

U.S. PATENT DOCUMENTS

| 2024/0143623 A1* | 5/2024 | Buckley ................ G06F 16/215 |
| 2024/0291863 A1* | 8/2024 | Cohen .................... G06F 21/53 |
| 2026/0003840 A1* | 1/2026 | Kulshreshtha ........ G06F 16/215 |

* cited by examiner

800

1000

SYSTEMS AND METHODS FOR DETECTING AND REMEDIATING INCONSISTENT TAGS IN CLOUD-NATIVE NETWORKS

FIELD OF THE DISCLOSURE

The present disclosure relates generally to networking and computing. More particularly, the present disclosure relates to systems and methods for detecting and remediating inconsistent tags in cloud-native networks.

BACKGROUND OF THE DISCLOSURE

With more enterprises moving to cloud-native networks, the implementation of on-premises networks is becoming less prevalent. The significant advantages of using cloud-native networks provide enterprises with more efficient solutions, but simultaneously introduce challenges when implementing and maintaining such networks. One of these challenges includes tagging assets with tags for policy enforcement and identification. In cloud-based systems, it is common to tag assets with compatible tags such as to define their security level, the environment in which they exist, the service they provide, etc. With thousands of assets existing in cloud-based systems, inconsistencies can be prevalent between existing assets and unknowingly introduced when onboarding new assets. The present disclosure provides systems and methods for detecting and preventing inconsistencies in asset tags.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include collecting tags from all resources in a cloud environment; converting each of the tags to a desired format and extracting unique tags in the desired format; calculating a similarity score between all of the unique tags in the desired format and creating tags pairs based on the similarity scores; and selecting a suggested tag for each of the tag pairs based on a number of appearances of each of the tags in the tag pairs.

The steps can further include wherein the number of appearances corresponds to the number of times a tag appears in the cloud environment. The tag pairs can be further created based on the similarity score of a pair exceeding a preconfigured threshold. The steps can further include providing a visual representation of similarity between all of the collected tags. Creating the visual representation can include calculating a vectorial representation of each tag. The steps can be performed on a per-tenant basis. The steps can further include identifying a new resource in the cloud environment; and utilizing one or more machine learning models to determine if the new resource has inaccurate tags and providing tag suggestions based thereon. The steps can further include training the one or more machine learning models are via any of supervised and unsupervised learning. A first machine learning model can be adapted to determine if the new resource includes inaccurate tags, and a second machine learning model can be adapted to provide tag suggestions based thereon. The first machine learning model can be trained with historical resource data.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
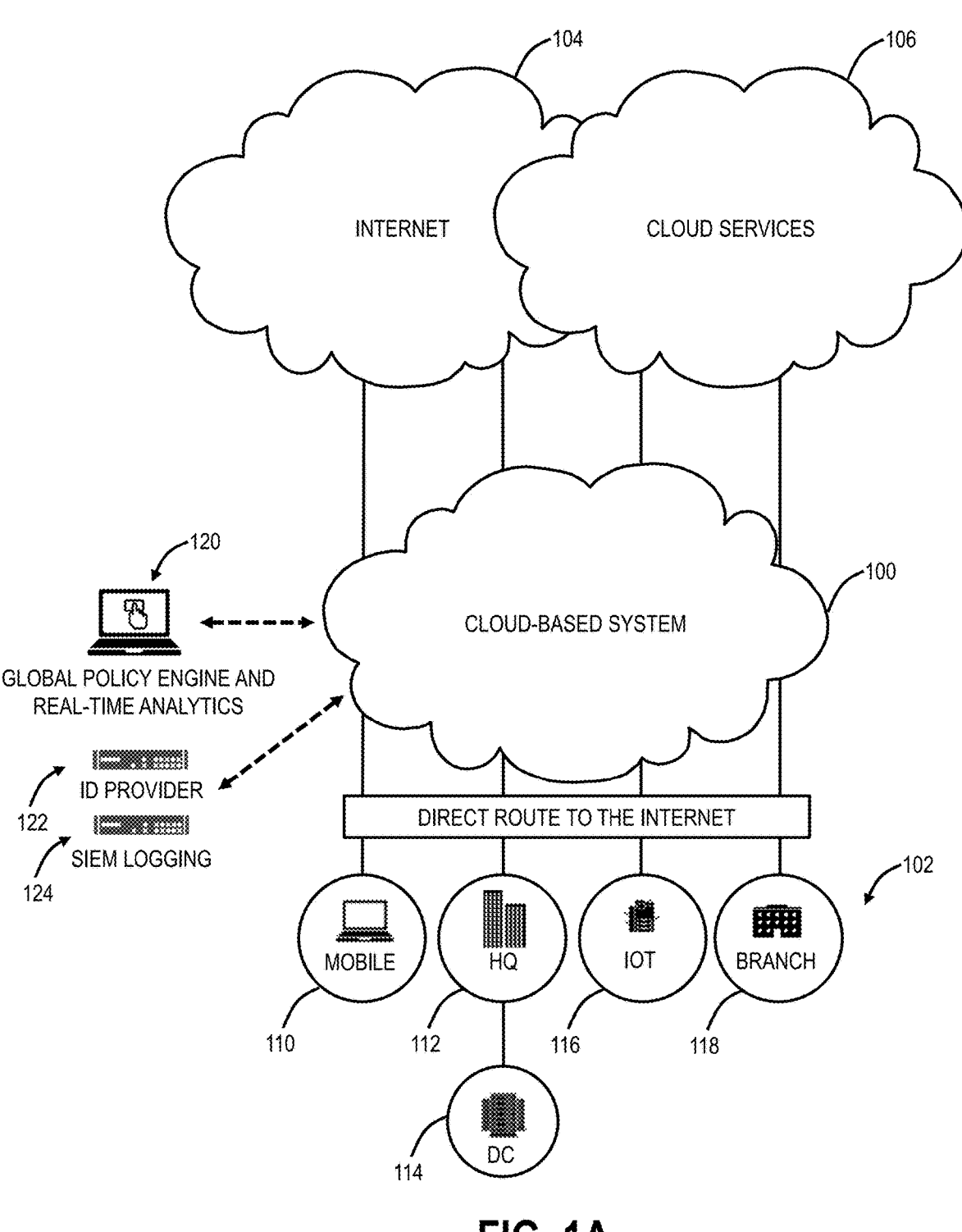
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
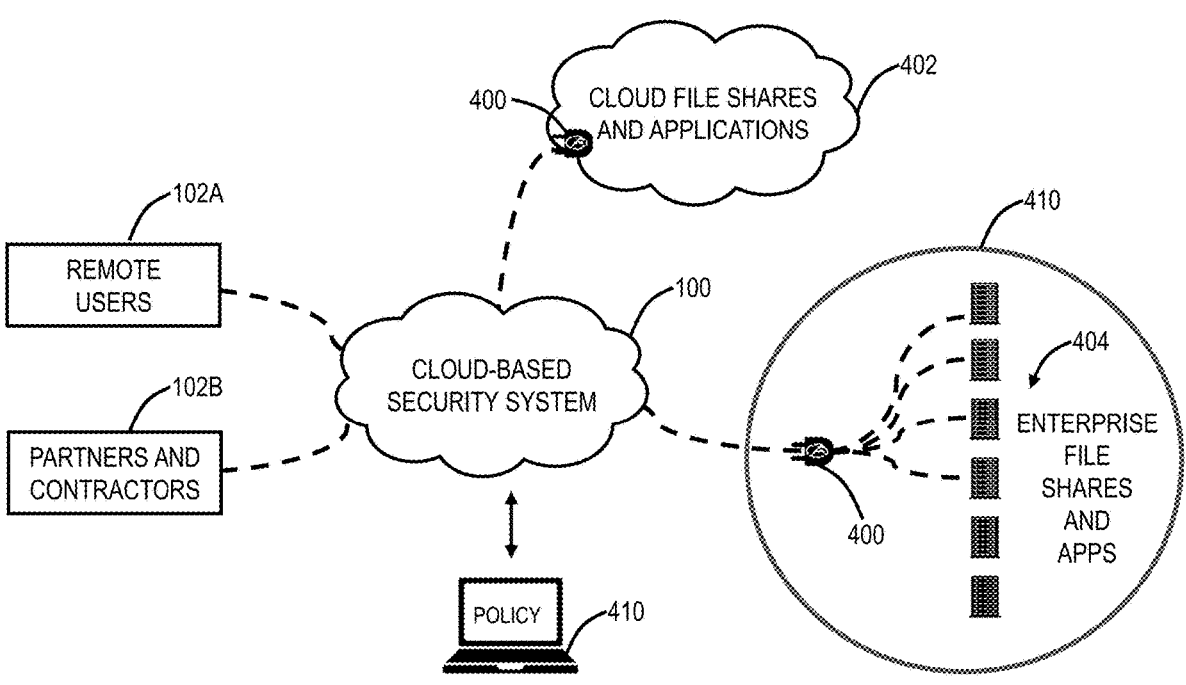
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
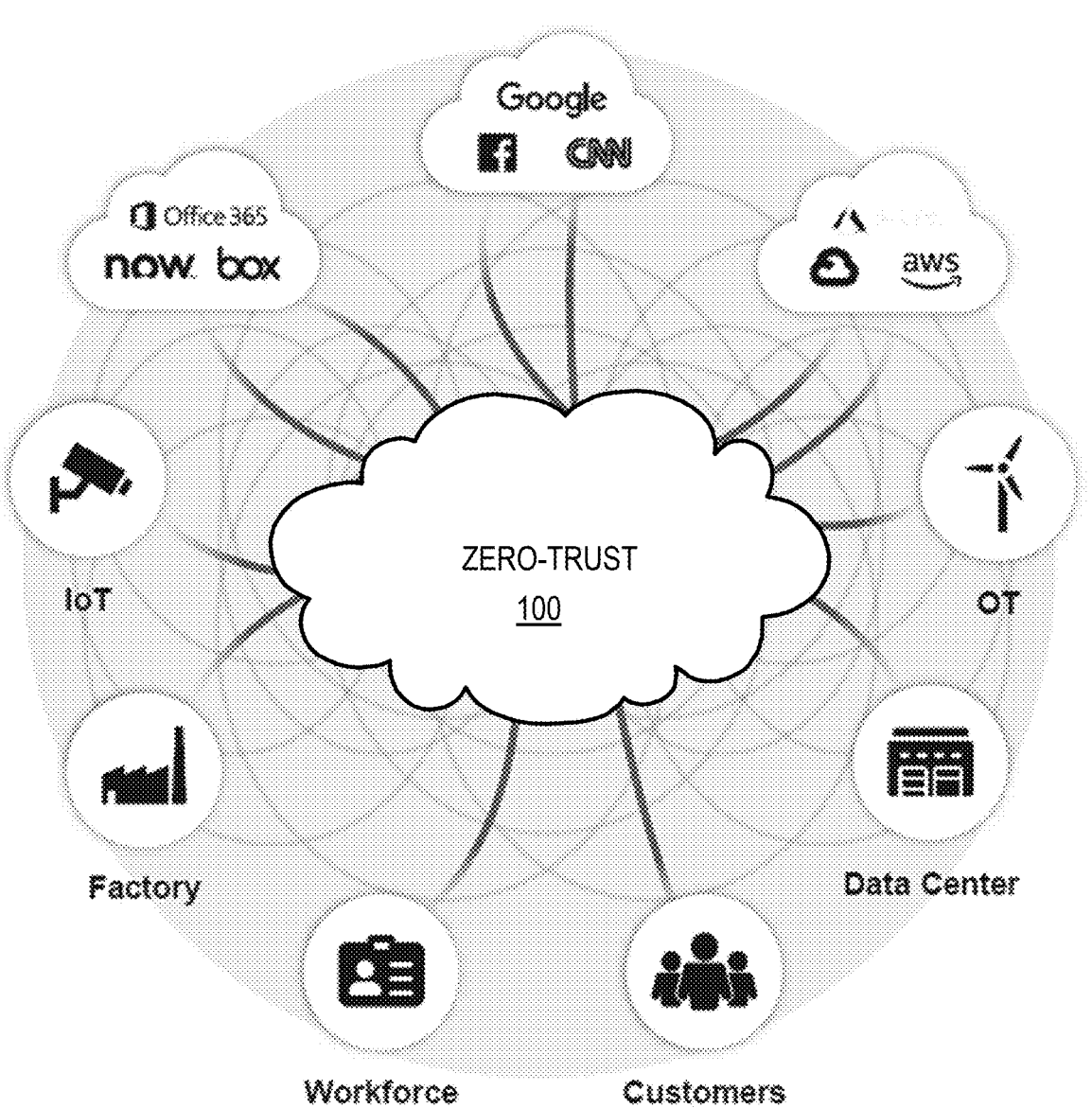
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA).

Direct user-to-app and app-to-app connections eliminate the risk of lateral movement and prevent compromised devices from infecting other resources. Plus, users and apps are invisible to the internet, so they cannot be discovered or attacked.

Figure 1C:
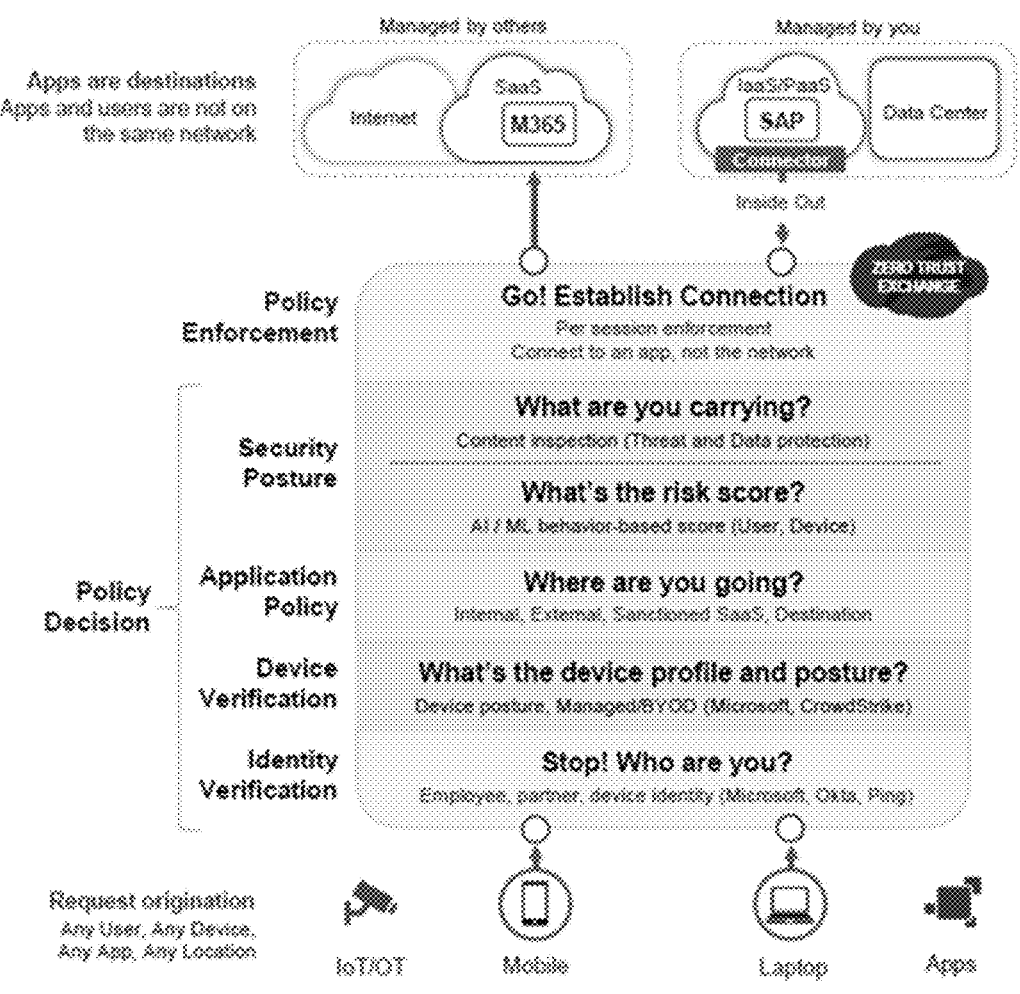
FIG. 1C is a logical diagram illustrating zero trust policies with the cloud-based system and a comparison with the conventional firewall-based approach.
Figure 1C:
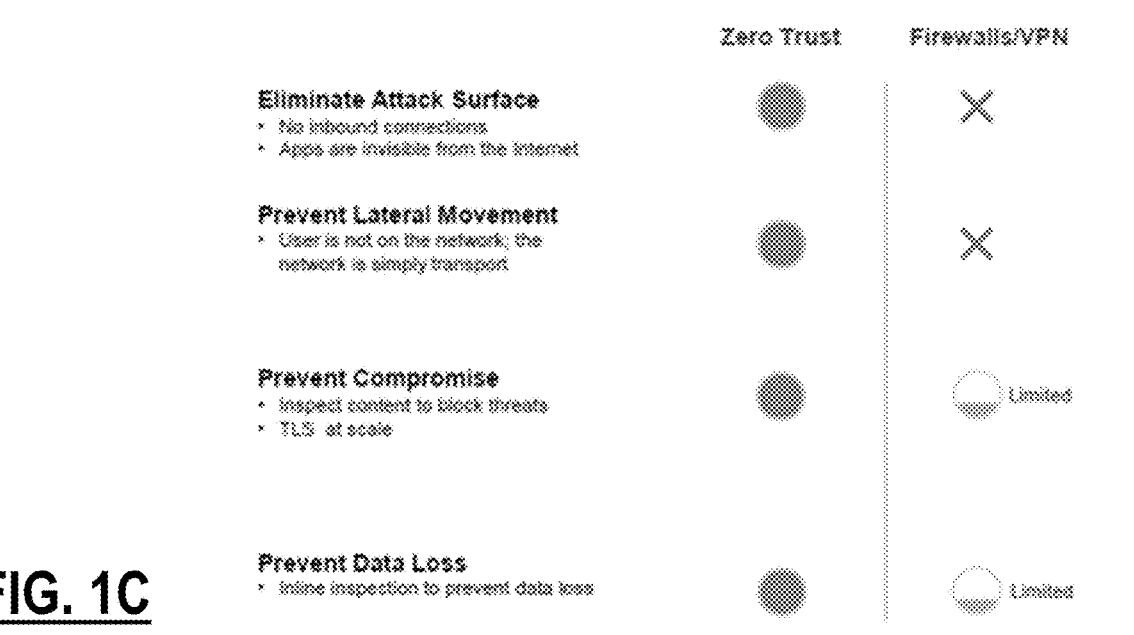

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
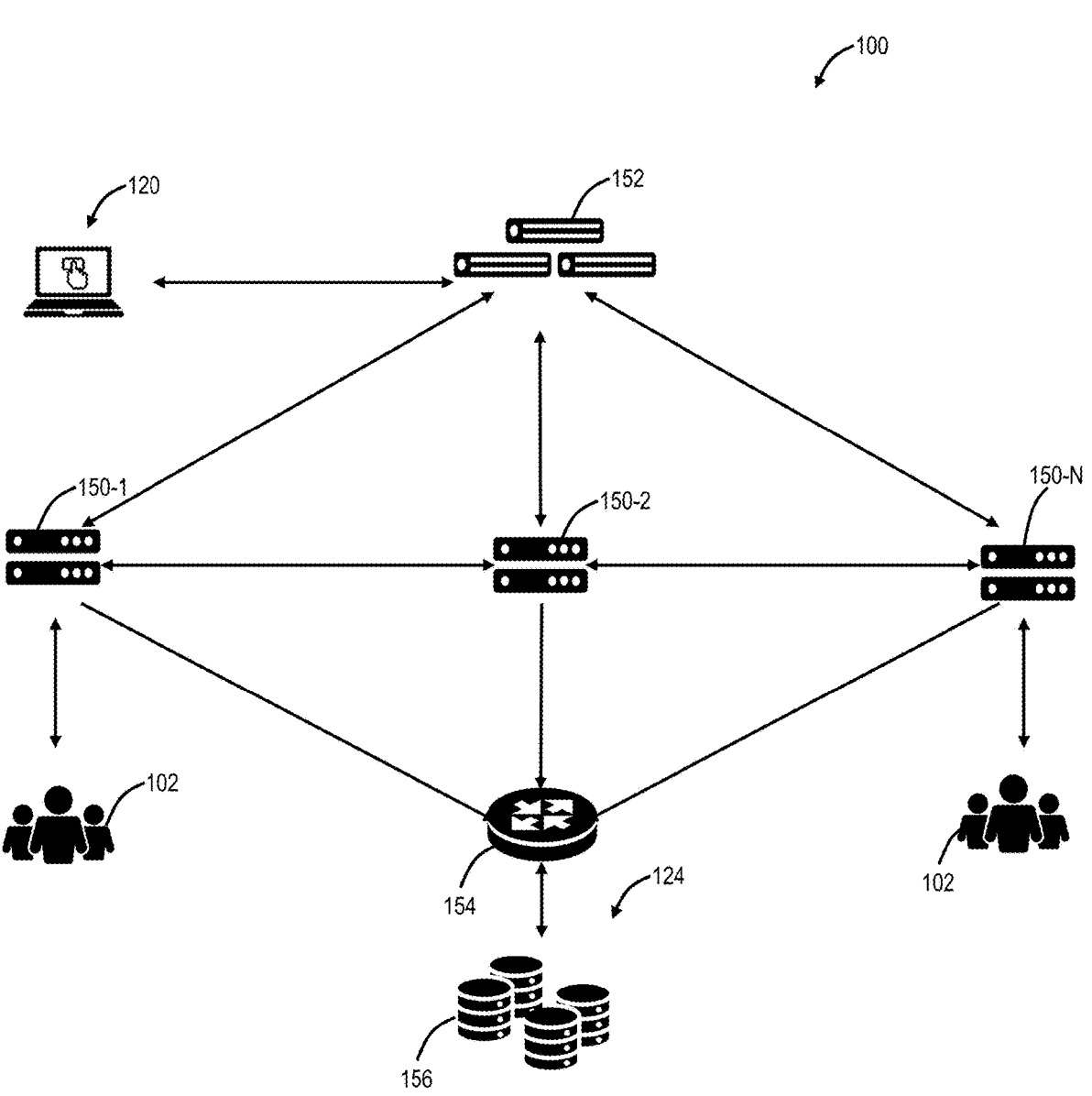
FIG. 2 is a network diagram of an example implementation of the cloud-based system.
Figure 4:
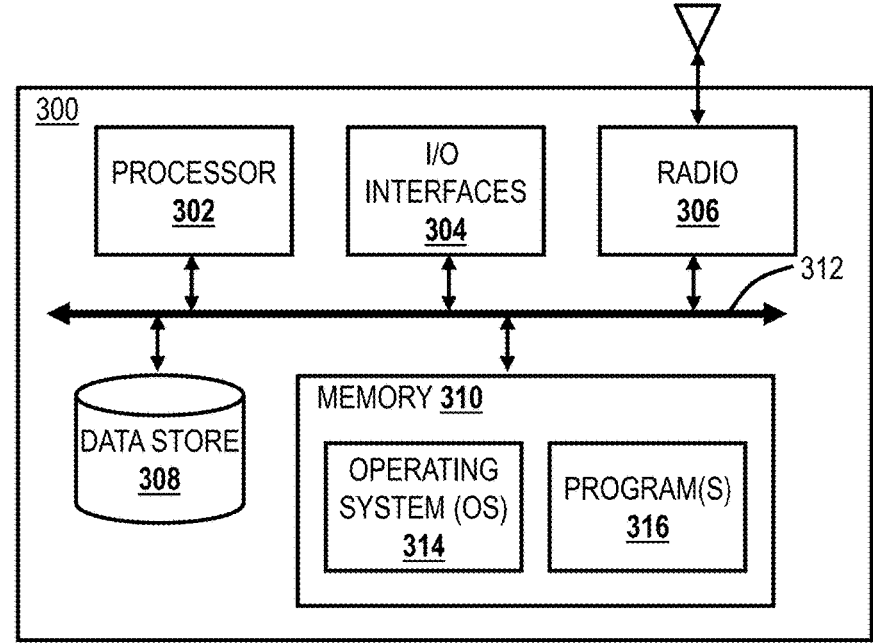

FIG. 2 is a network diagram of an example implementation of the cloud-based system 100. In an embodiment, the cloud-based system 100 includes a plurality of nodes 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to an node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
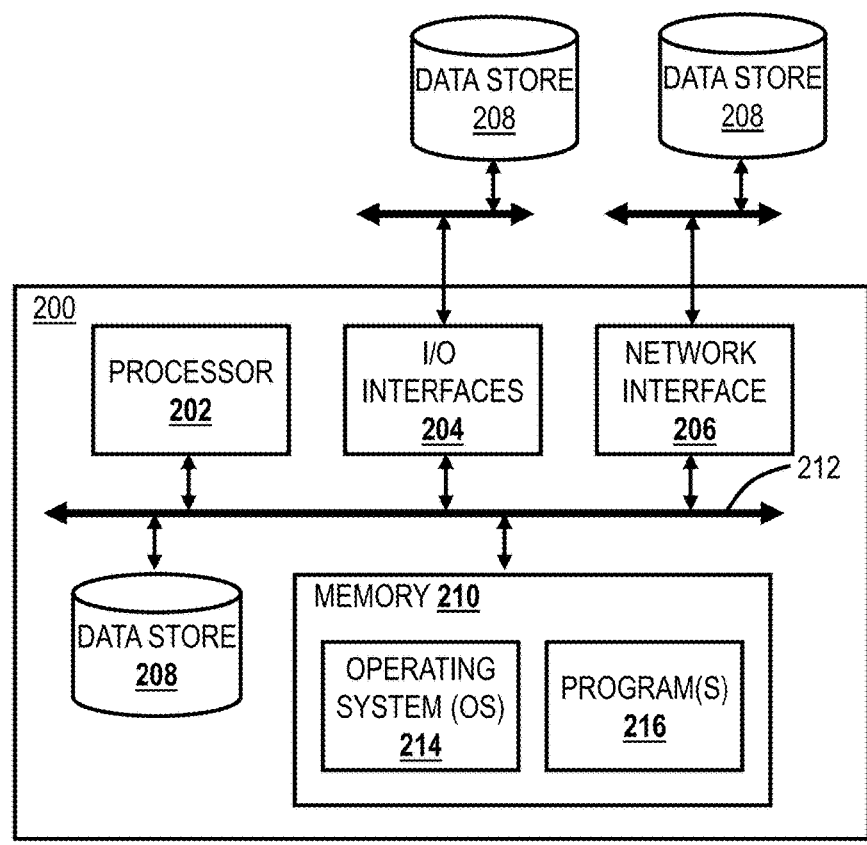
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Digital Experience Monitoring

Figure 6:
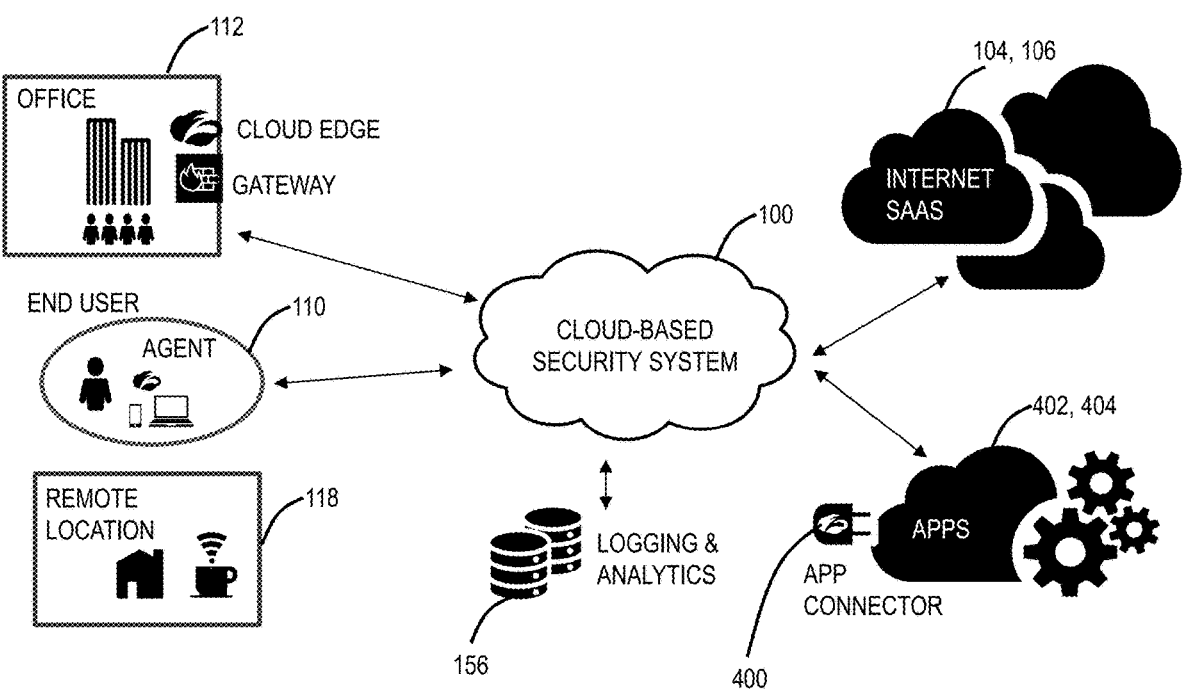
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

User Device Application for Traffic Forwarding and Monitoring

Figure 7:
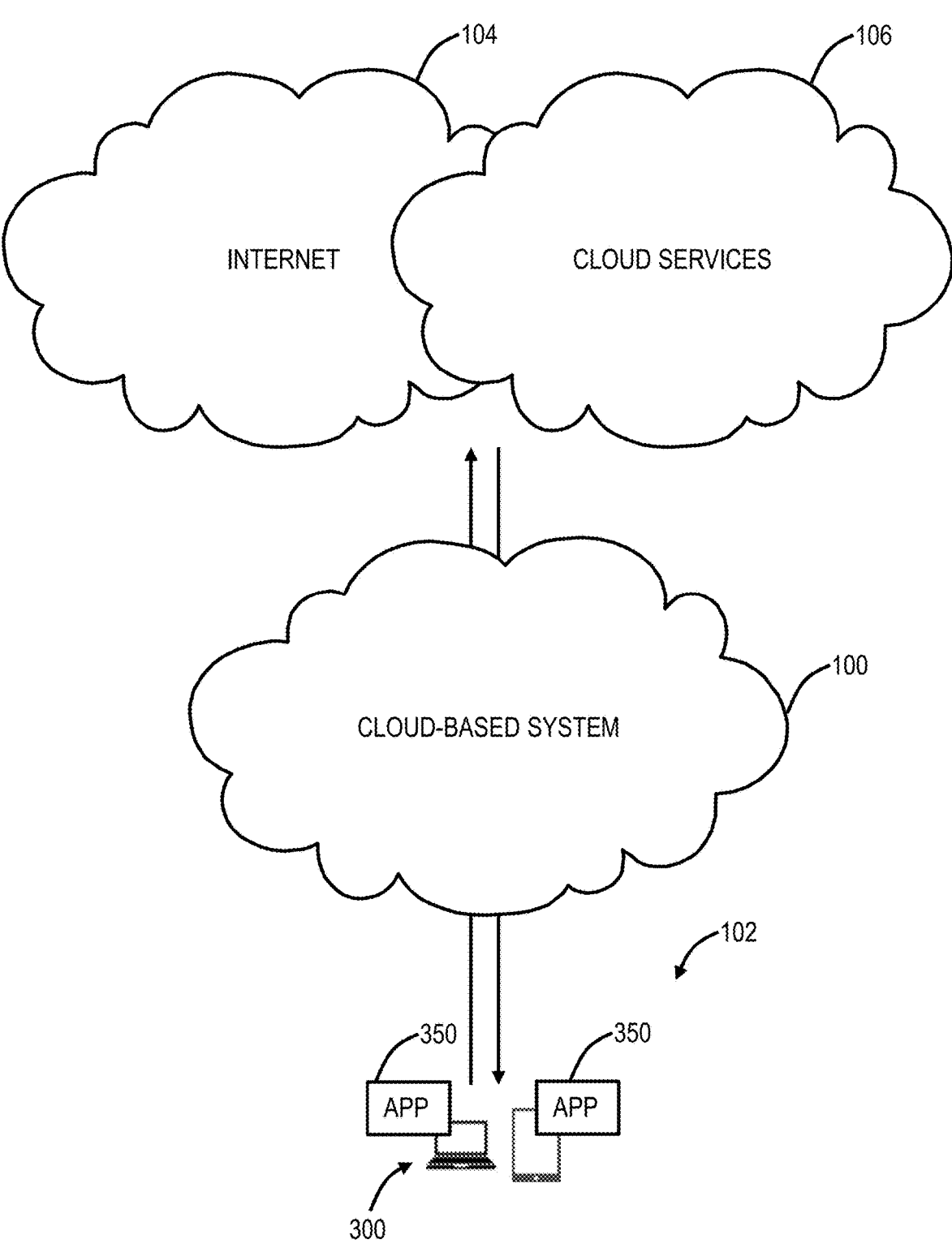
FIG. 7 is a network diagram of the cloud-based system illustrating an application on user devices with users configured to operate through the cloud-based system.

FIG. 7 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

Machine Learning in Network Security

Machine learning can be used in various applications, including malware detection, intrusion detection, threat classification, the user or content risk, detecting malicious clients or bots, detecting inaccurate asset tags, recommending correct tags, etc. In a particular use case, machine learning can be used to scan for inaccurate asset/resource tags/keys in the cloud-based system 100 and provide suggestions for correcting the inaccurate keys to protect users and resources form being left out of important policy rules due to inaccurate tagging.

In an embodiment, a generated machine learning model is a decision tree. A trained model may include a plurality of decision trees. Each of the plurality of decision trees may include one or more nodes, one or more branches, and one or more termini. Each node in the trained decision tree represents a feature and a decision boundary for that feature. Each of the one or more termini is, in turn, associated with an output probability. Generally, each of the one or more nodes leads to another node via a branch until a terminus is reached, and an output score is assigned.

Figure 8:
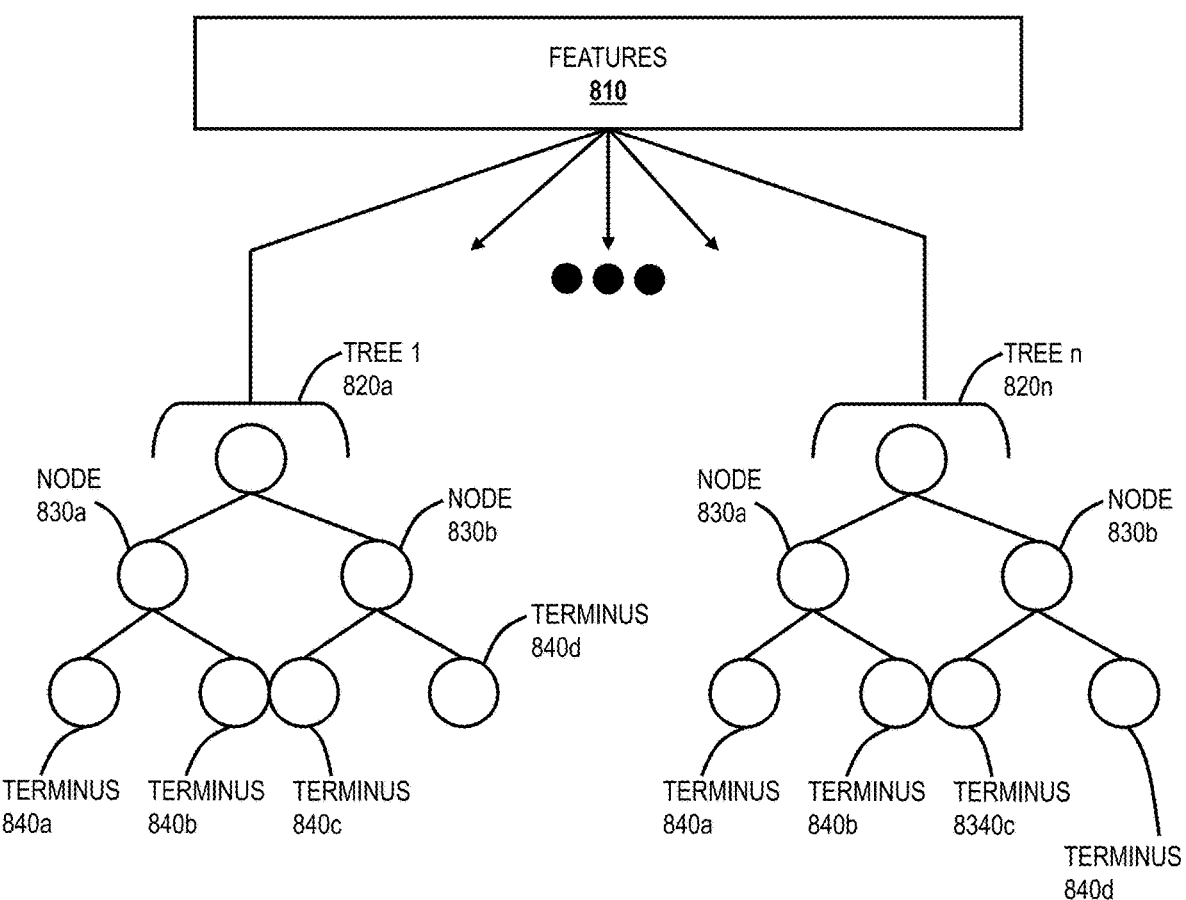
FIG. 8 is a diagram of a trained machine learning model.

FIG. 8 is a diagram of a trained machine learning model 800. The machine learning model 800 includes one or more features 810 and multiple trees 820*a*, 820*n*. A feature is an individual measurable property or characteristic of a phenomenon being observed. The trees 820*a*, 820*n* can be decision trees associated with a random forest or a gradient boosting decision trees machine learning model. In various embodiments, the trees 820*a*, 820*b* are constructed during training. While the machine learning model 800 is only depicted as having trees 820*a*, 820*n*, in other embodiments, the machine learning model 800 includes a plurality of additional trees. The features 810, in the context of inaccurate key detection, relate to various properties or characteristics of the keys.

The trees 820*a*, 820*n* include nodes 830*a*, 830*b* and termini 840*a*, 840*b*, 840*c*, 840*d*. That is, the node 830*a* is connected to termini 840*a*, 840*b* and the node 830*b* is connected to termini 840*c*, 840, via one or more branches. In other embodiments, the trees 820*a*, 820*n* include one or more additional nodes, one or more additional branches, and one or more additional termini. The nodes 830 each represent a feature and a decision boundary for that feature. The termini 840 can each be associated with a probability of inaccuracy, in the example of inaccurate key detection. Generally, each of the one or more nodes leads to another node via a branch until a terminus is reached, and a probability of inaccuracy is assigned. The output of the trained machine learning model 800 is a weighted average of a probability of inaccuracy predicted by each of the trees 820*a* and the tree 820*n*.

Multiple different machine learning models can be used as an ensemble model that obtain better predictive performance than could be obtained from any of the constituent machine learning models alone. The individual models in an ensemble model could be tree-based (e.g., the decision tree used by gradient boosting decision trees and random forest) or neural networks or any other machine learning model where the prediction follows a decision path or activation path. For illustration purposes, the foregoing examples relate to decision trees.

The machine learning model 300 is an example of a decision tree. A decision tree is a tool that uses a tree-like model of decisions and their possible consequences, including chance event outcomes, resource costs, and utility. It is one way to display an algorithm that only contains conditional control statements, i.e., if . . . then . . . else. Random forests or random decision forests are an ensemble model for classification, regression and other tasks that operates by constructing a multitude of decision trees at training time and outputting the class that is the mode of the classes (classification) or mean prediction (regression) of the individual trees. Random decision forests correct for decision trees' habit of overfitting to their training set. Of note, each of the decision trees is independent of one another in the case of Random Forest. Gradient Boosting Decision Trees are dependent between one another. Gradient boosting is a machine learning technique for regression and classification problems, which produces a prediction model in the form of an ensemble of weak prediction models, typically a decision tree.

In an exemplary use case, a machine learning model can be trained and utilized to detect and provide suggestions for inaccurate resource tags (tags, keys, etc.). That is, a machine learning model can be trained with data for identifying inaccuracies in resource keys. This data can include how resources in a cloud-based system respond to policy. For example, a resource with inaccurate keys will not respond accordingly to specified policy due to the inaccurate tagging. Further, a machine learning model can be trained to predict and provide suggestions to correct the inaccurate tags. The data that can be utilized to train such models is further described herein.

It will be known to one of ordinary skill in the art that the one or more machine learning models described herein can be trained via any conventional method such as supervised or unsupervised learning.

An inaccuracy detection engine may utilize machine learning to detect both known and unknown resource tag inaccuracies. This approach typically uses supervised learning methods to learn from and make predictions on a large corpus of data, such as a large number of resource data samples. The various resource data samples can include resources with correct tagging as well as resources with inaccurate tagging and how they respond based on preconfigured policy. The typical machine learning training process collects millions of resource data samples, extracts a set of features from these samples, and feeds the features into a machine learning model to determine patterns in the data. The output of this training process is a machine learning model that can predict whether a resource that has not been seen before has inaccurate tags or not, thereby correcting any tagging issues before security threats can arise.

As described herein, one or more machine learning models can be trained and utilized to provide suggestions when an inaccuracy is detected. The methods for determining a tag suggestion is described further herein, and can be utilized to train a machine learning model to automatically provide such suggestions based on the incorrect tag that is detected.
Inconsistent Resource Tags With more enterprises moving to cloud-native networks, the implementation of on-premises networks is becoming less prevalent. The significant advantages of using cloud-native networks provide enterprises with more efficient solutions, but simultaneously introduce challenges when implementing and maintaining such networks. One of these challenges includes tagging assets with tags for policy enforcement and identification. In cloud-based systems, it is common to tag assets with compatible tags such as to define their security level, the environment in which they exist, the service they provide, etc. With thousands of assets existing in cloud-based systems, inconsistencies can be prevalent between existing assets and unknowingly introduced when onboarding new assets. The present disclosure provides systems and methods for detecting and preventing inconsistencies in asset tags.

Inconsistent tags are tags that have some inconsistency with the rest of the tags in the network or cloud-based system. These inconsistencies can be caused by typos, semantical keys, different tenses used, redundant spaces before or after the tag, inconsistent capitalization, and the like. The following shows various examples of tag inconsistencies.

'Environment'—'environment'→inconsistent capitalization

'AWSBackup'—'Backup'→inconsistent semantic

'Node'—'NodeID'→inconsistent semantic

'AWSServiceName'→'cloud-servicename'→inconsistent semantic

'map-migration'—'map-migrated'→inconsistent tense

'Prod'—'Production'→inconsistent wording

'SSO'—'SSO'→inconsistent spacing

'Owner'—'Onwer'→inconsistent typo

If such inconsistencies go unnoticed, various security risks can be introduced to the environment. Such risks caused by inconsistent tags can include missing alerts due to missing instances when the alerts are based on instances' tags, or vulnerable instances when some host patching is executed based on instant tags, permissions granted to unnecessary instances, and the like. These risks that are introduced due to inconsistent tags induce the need to provide the systems and methods for detecting these inconsistent tags and provide remediation to eliminate unnecessary risk in cloud environments.

In various embodiments, the present systems and methods can be executed on a per-network/tenant basis to provide the networks inconsistent tags, their number of appearances, the suggested tag to be used, and the suggestions appearances. In order to find the inconsistencies, a data preparation stage is induced. This includes collecting all key-tag pairs (tags) for each resource/asset in the desired environment. Various example tags (key-value) pairs are shown below.

| Resource Name | Key-Value Pairs |
|---|---|
| AWS/Resource: 1 | {'Owner': 'John, 'Project': 'Proj-1', 'Patch Group': '1', 'Application': 'sso'', 'prod': 'True'} |
| AWS/Resource: 2 | {'Owner': 'John', 'Project ': 'Proj-1', 'Patch Group': '1', 'Application': 'sso', 'production': True'} |
| AWS/Resource: 3 | {'Onwer': 'John', 'PROJECT': 'Proj-1', 'Patch Group': '1', 'application': 'sso', 'prod':'True'} |
| AWS/Resource: 4 | {'Owner': 'John ', 'Project': 'Proj-1', 'Patch-Group': '1', 'application': 'sso', 'prod': 'true'} |

It shall be noted that there is a space after the word in the key: "Project" in Resource 2, which is not equal to the key: "Project" without a space. This is an example of a common mistake/inconsistency. The systems and methods then include separating each tags key for each resource and saving the aggregation of the key counts as shown below. It will be appreciated that the present example demonstrates searching for inconsistencies in the keys only of the tag's keys, but other embodiments can include performing the same steps for finding inconsistencies in the values of the key-value pairs. Further, the finding of inconsistencies can be performed by a trained machine learning model as described herein. This finding/identifying can be performed on a per-tenant basis and can be triggered based on new resources being introduced to the network/environment.

| Index | Key Counts |
|---|---|
| 'Owner' | 3 |
| 'Patch Group' | 3 |
| 'prod' | 3 |
| 'Project' | 2 |
| 'application' | 2 |
| 'Application' | 1 |
| 'PROJECT' | 1 |
| 'Onwer' | 1 |
| 'Project' | 1 |

From the example shown above, relating to the 4 resources, it can be seen that Resource 1, Resource 2, and Resource 4 have an "Owner" key while Resource 3 has an "Onwer" key which is an inconsistency. This is reflected in the key counts shown above. The key of "Owner" appears 3 times while the key of "Onwer" appears 1 time. This data will be utilized in further steps, and can be further utilized as features for training the one or more machine learning models.

Once the data preparation stage is completed, a finding stage is initiated to provide findings from matching cases between tags' keys. This allows the systems to determine if the matching cases arose from inconsistent tags. In an embodiment, in order to match cases, the systems are adapted to separate all unique keys in the lower format (or any of the other formats). In another embodiment, the present systems are adapted to aggregate the tags keys, and find all unique keys by lowering and stripping each of the keys. Lowering and stripping includes converting each key to a lower case format and stripping any redundant spaces before or after each key and then finding matching keys in the "lower strip" format. This lower strip format can be considered a desired format for matching, as can any of the other described formats. The table below shows how this separation and aggregation takes place, and how the lower strip format can help to aggregate similar keys which might include inconsistencies such as capitalization and extra redundant spaces. Again, the lower strip format includes taking the original tags and converting them to lower case form while stripping away any redundant spaces.

| Index | Keys Count | lower_strip |
|---|---|---|
| 'Project' | 2 | 'project' |
| 'Project ' | 1 | 'project' |
| 'PROJECT' | 1 | 'project' |
| 'Patch-Group' | 1 | 'patch-group' |
| 'Patch Group' | 3 | 'patch group' |
| 'Owner' | 3 | 'owner' |
| 'prod' | 3 | 'prod' |
| 'Onwer' | 1 | 'onwer' |
| 'application' | 2 | 'application' |

From the steps described above, all unique "lower strip" keys can be extracted. That is, once all of the keys are in the desired format (lower strip), each unique key can be extracted in the desired format. Because some of the inaccuracies come from capitalization and extra spaces, this process further consolidates the list of collected keys. These unique keys are shown below.

['owner', 'patch group', 'project', 'application', 'onwer', 'patch-group', 'prod', 'production']

In various embodiments, a string similarity sub-stage can be initiated in order to measure a similarity between strings (keys). In this string similarity sub-stage, a measurement technique can be provided to the present systems, such as via a configuration on a per-tenant basis, for string similarity measurements. In the present example, a Getalst Pattern Matching technique is utilized, but other string similarity techniques are also contemplated such as the Levinstein Distance technique, and the like. The provided string similarity technique is applied to each of the unique keys in order to find matches for each one from all of the keys. An example of utilizing the Getalst Pattern Matching string similarity technique is shown below.

The similarity of two strings S1 and S2 is determined by calculating twice the number of matching characters Km divided by the total number of characters of both strings. The matching characters are defined as some longest common substrings plus recursively the number of matching characters in the non-matching region on either side of the longest common substring. This equation is:

$$D_{ro} = \frac{2K_m}{|S_1| + |S_2|}$$

An example visual representation of this technique is shown by comparing the keys "patch-group" and "patch group".

| p | a | t | c | h | — | g | r | o | u | p |
| p | a | t | c | h |   | g | r | o | u | p |

The longest substring starting from the left is "patch" with a length of 5. After that, the non-matching substrings on the right are "-group" and "group". This has a longest common substring of "group" with a length of 5. In this example, the equation will be utilized as follows to determine the similarity score.

$$D_{ro} = \frac{2K_m}{|S_1| + |S_2|} = \frac{2(|patch| + |group|)}{|S_1| + |S_2|} = \frac{2(5+5)}{11+11} = 0.909$$

The systems can then utilize a similarity score threshold to drop any key pairs that are not similar enough. That is, each key is compared to all of the keys, and the pairs (tag pairs) that have a similarity score above the provided threshold are retained. In this example, each "lower strip" key is compared to each other. Such tag pairs from the present example are shown below.

["owner", "onwer" ]
['production', 'prod']
["patch group", "patch-group" ]
["project" ]
["application" ]
["onwer", "owner" ]
["patch-group", "patch group" ]

In this example, the keys "application" and "project" did not have a match which exceeded the threshold. Each "best match" for each key shown above can be considered a suggestion. That is, it can be considered a suggestion for replacing the original key to remove any inconsistencies. These suggestions are shown below.

["onwer" ]
['prod']
["patch-group" ]
["project" ]
["application" ]
["owner" ]
["patch group" ]

These suggestions are then checked to see if they exist in the lower strip group and/or the original data group, i.e., the keys originally collected from the environment. The key matches are shown below with associated similarity scores.

| Matches | Similarity Score |
| --- | --- |
| patch group/patch-group | 0.9090909090909091 |
| onwer/owner | 0.8 |
| production/prod | 0.5714285714285714 |

From the previous steps, the collected data can be aggregated and sorted in a temporary table. The table includes the original keys collected from the environment, the key count, and various calculated data. The calculated data includes the most similar key, if it exist, for each key (close tag) by its lower strip aggregation, the lower strip format of each key aggregated with their matching original key (lower strip), the similarity score of each close tag in the close tag column (similarity close tag), and the number of appearances of each close tag in the close tag column (close tag count). An example of the original collected data and the calculated data are shown below.

| Index | Key Counts | lower_strip | close_tag | similarity_ close_ tag | close_ tag_ count |
| --- | --- | --- | --- | --- | --- |
| 'Project' | 2 | 'project' | | 0 | |
| 'Project ' | 1 | 'project' | | 0 | |
| 'PROJECT' | 1 | 'project' | | 0 | |
| 'Patch-Group' | 1 | 'patch-group' | 'Patch Group' | 0.909 | 3 |
| 'Patch Group' | 3 | 'patch group' | 'Patch-Group' | 0.909 | 1 |
| 'Owner' | 3 | 'owner' | 'Onwer' | 0.8 | 1 |
| 'prod' | 3 | 'prod' | 'production' | 0.571 | 1 |
| 'Onwer' | 1 | 'onwer' | 'Owner' | 0.8 | 3 |
| 'application' | 2 | 'application' | | 0 | |

In a classification stage, the maximum value among all keys within the same lower strip aggregation is calculated together with the close match suggested tag (close tag), if it exists. For example, for the key "Patch Group", the key count for "Patch Group" is 3 while the key count for its closest match key (close tag) of "Patch-Group" is 1. Therefore, the maximum value is 3 and the suggested key is identified as "Patch Group". The table shown below highlights the suggested key for each row, i.e., each original key. The suggested keys are highlighted based on the maximum value calculation described herein. Again, this data can be utilized to train one or more machine learning models for providing suggestions when inaccurate tagging is identified.

| Index | Key Counts | lower_strip | close_tag | similarity_ close_ tag | close_ tag_ count |
| --- | --- | --- | --- | --- | --- |
| 'Project' | 2 | 'project' | | 0 | |
| 'Project ' | 1 | 'project' | | 0 | |
| 'PROJECT' | 1 | 'project' | | 0 | |
| 'Patch-Group' | 1 | 'patch-group' | 'Patch Group' | 0.909 | 3 |
| 'Patch Group' | 3 | 'patch group' | 'Patch-Group' | 0.909 | 1 |
| 'Owner' | 3 | 'owner' | 'Onwer' | 0.8 | 1 |
| 'prod' | 3 | 'prod' | 'production' | 0.571 | 1 |
| 'Onwer' | 1 | 'onwer' | 'Owner' | 0.8 | 3 |
| 'application' | 2 | 'application' | | 0 | |

A clustering stage can be utilized to make sure that each key is matched with the correct suggestion to prevent a circle of suggestions. For example, "onnwer" should be "owner" should be "Owner", and "Owner" should be "owner".

To prevent this, the systems go through each inconsistency classification found, and check if it exists in in the found inconsistent tags. The table below shows an example.

| Index | Key Count | Close tag | Similarity close tag | Close tag count |
|---|---|---|---|---|
| "Owner" | 3 | "Onwer" | 0.8 | 2 |
| "Onwer" | 2 | "Owner" | 0.8 | 3 |
| "OWNER" | 1 | "Owner" | 1 | 3 |
| "Onnwer" | 1 | "Onwer" | 0.909 | 2 |

In the table above, the systems search if the pair "Onnwer" and "Onwer" exists and if there is another appearance of both. It can be seen that there are no other appearances of "Onnwer", but "Onwer" does have other appearances as shown in the table. In such cases, the key with the most appearances is used as the suggestion for all of the keys in the table shown above, in this case the suggestion is "Owner".

In various embodiments, a tag encoding stage is utilized to illustrate their similarity. First the systems provide a density matrix known to one of skill in the art as a "bag of words", wherein a classic use case includes counting the frequency of each word. For the present systems and methods, this matrix is used to calculate the similarity of each word relative to each of the other words (keys). In an embodiment, all keys are put into lower case form and a similarity score is produced for each pair in the matrix. This is shown in the following table.

By reducing the complexity of the model, the learning algorithms performance can be improved. That is, in various embodiments, the data collected and calculated from the steps described herein can be utilized to train one or more machine learning models. These trained machine learning models can then be utilized to automatically identify inaccuracies in asset tags, keys, etc. and automatically provide suggestions for what the keys should be in order to comply with the rest of the cloud environment or cloud-based system. The machine learning model training can be performed based on any of the disclosed methods herein and implemented in the cloud-based system to service any tenants of the cloud-based system and their respective environments/networks.

In an embodiment one or more machine learning models can be trained to determine if the new resource has inaccurate tags, and provide tag suggestions based thereon. That is, when a new resource is onboarded to the cloud environment, a machine learning model can be adapted to determine if that resource includes any inaccurate tags such as keys, etc. such a machine learning model can be trained on historical resource data from other resources in the environment. This historical resource data can include how other resources in the environment which include correct tags respond to various actions such as alerts, permissions granted, their security level, the environment in which they exist, the service they provide, and the like. For example, if a specific type of resource in the environment has specific permission requirements, and a new resource with the same requirements is added to the environment, its behavior can be monitored to determine if it is behaving in a desired manner, thereby determining if the new resource includes inaccurate tags. Similarly, a second machine learning model can be trained, based on the data described herein, to suggest new

| | 'Onwer' -> 'onwer' | 'Owner'-> 'owner' | 'OWNER' -> 'owner' | 'Onnwer' -> 'onnwer' | 'Patch-Group' -> 'patch-group' | 'Patch Group' -> 'patch group' |
|---|---|---|---|---|---|---|
| 'Onwer' -> 'onwer' | 1 | 0.8 | 0.8 | 0.909 | 0.125 | 0.125 |
| 'Owner'-> 'owner' | 0.8 | 1 | 1 | 0.727 | 0.125 | 0.125 |
| 'OWNER' -> 'owner' | 0.8 | 1 | 1 | 0.727 | 0.125 | 0.125 |
| 'Onnwer' -> 'onnwer' | 0.909 | 0.727 | 0.727 | 1 | 0.727 | 0.2 |
| 'Patch-Group' -> 'patch-group' | 0.125 | 0.125 | 0.125 | 0.727 | 1 | 0.909 |
| 'Patch Group' -> 'patch group' | 0.125 | 0.125 | 0.125 | 0.2 | 0.909 | 1 |

Figure 9:
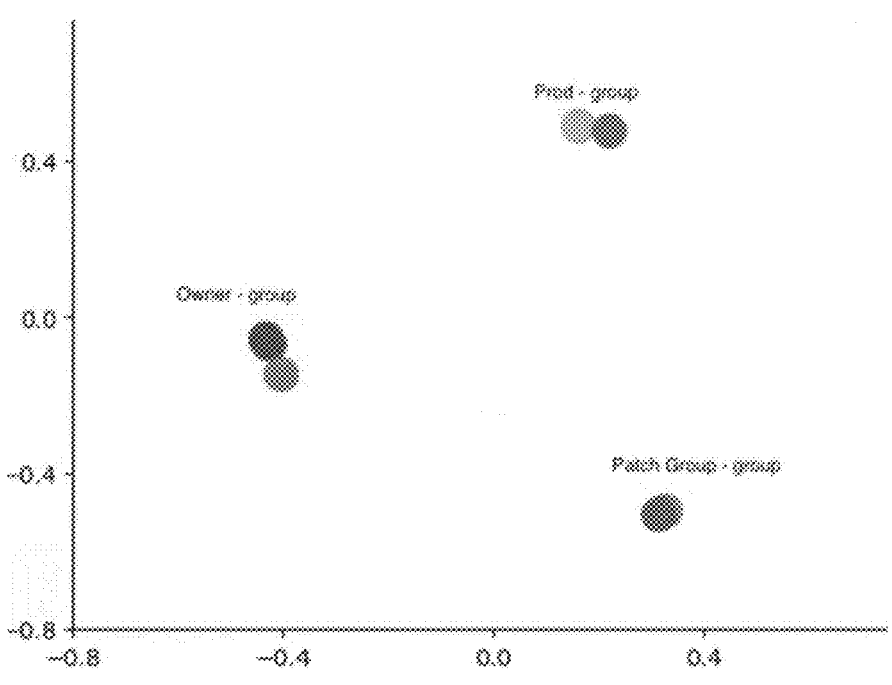
FIG. 9 is an example of a 2D visual representation of tag similarity in a cloud environment.
Figure 10:
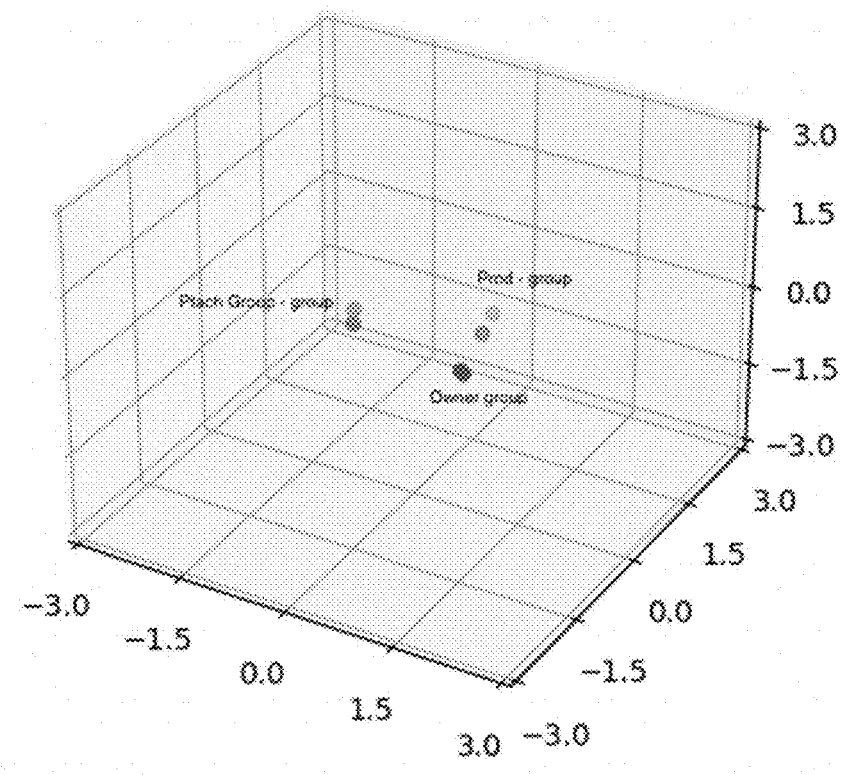
FIG. 10 is an example of a 3D visual representation of tag similarity in a cloud environment.

In the table above, the vectorial representation of each tag key can be seen. The systems are then adapted to utilize a dimensionality reduction model such as Principal Component Analysis (PCA), T-distributed Stochastic Neighbor Embedding (TSNE), a neural network, or the like to provide a vectorial representation of the keys, i.e., by utilizing a graphical representation such as a scatter plot or the like. In various embodiments, one or more machine learning models can be utilized to perform dimensional reduction into 2 or 3 dimensions in order to plot the data. Such a plot is depicted in FIG. 9 (2 dimensional) and FIG. 10 (3 dimensional).

tags if inaccurate tags are identified. Again, the one or more machine learning models can be trained via any of supervised and unsupervised learning.

The present systems and methods aim to identify and remedy any mistagging in cloud environments. This is important as mistagged resources can introduce various security risks to data and users in the cloud environment. This disclosure provides various steps to determine tag suggestions for resources in order to create a consistently tagged environment. Additionally, one or more machine learning models can be trained with the data collected from these methods to automatically detect and remedy mistagged resources. In this way, policy and rules associated therewith can function as intended to protect users and their data.

Process for Remediating Inconsistent Resource Tags

Figure 11:
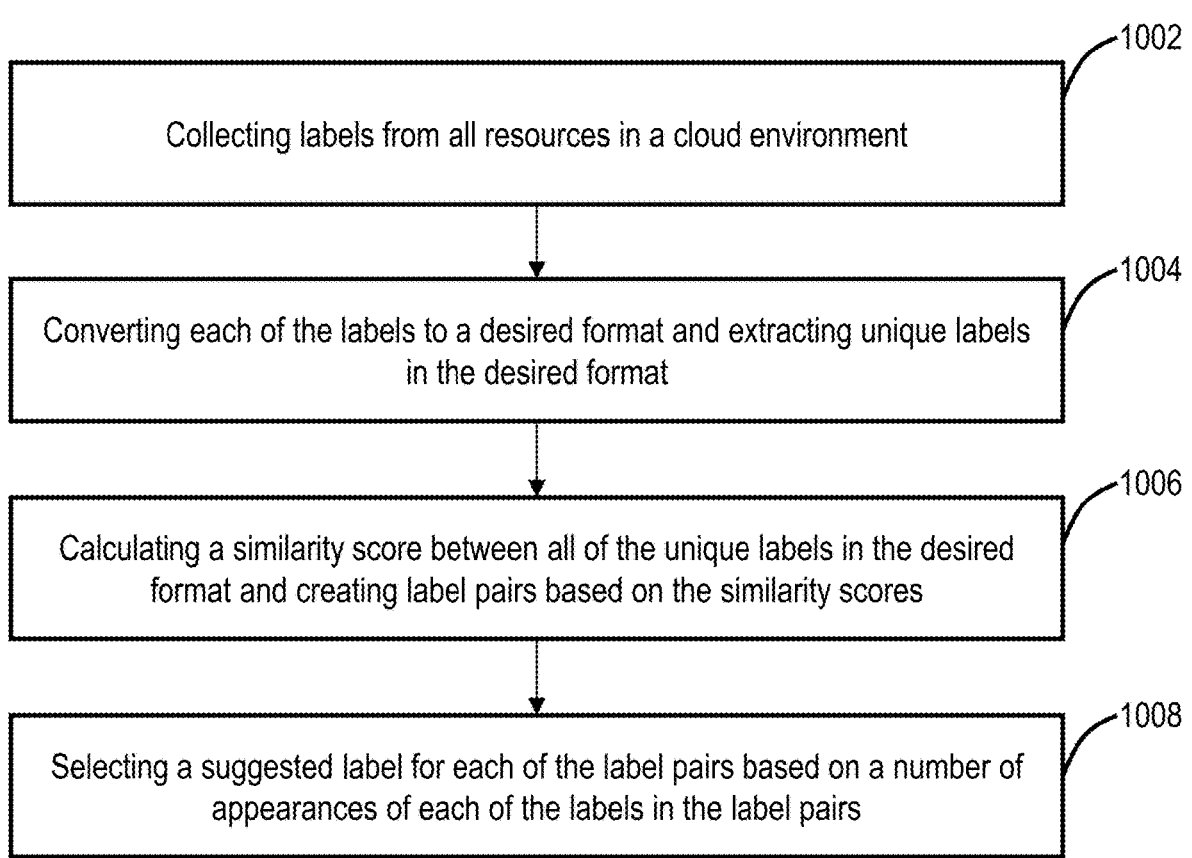
FIG. 11 is a flowchart of a process for detecting and remediating inconsistent tags in cloud-native networks.

FIG. 11 is a flowchart of a process for detecting and remediating inconsistent tags in cloud-native networks. The process 1000 includes collecting tags from all resources in a cloud environment (step 1002); converting each of the tags to a desired format and extracting unique tags in the desired format (step 1004); calculating a similarity score between all of the unique tags in the desired format and creating tags pairs based on the similarity scores (step 1006); and selecting a suggested tags for each of the tag pairs based on a number of appearances of each of the tags in the tag pairs (step 1008).

The process 1000 can further include wherein the number of appearances corresponds to the number of times a tag appears in the cloud environment. The tag pairs can be further created based on the similarity score of a pair exceeding a preconfigured threshold. The steps can further include providing a visual representation of similarity between all of the collected tags. Creating the visual representation can include calculating a vectorial representation of each tag. The steps can be performed on a per-tenant basis. The steps can further include identifying a new resource in the cloud environment; and utilizing one or more machine learning models to determine if the new resource has inaccurate tags, and providing tag suggestions based thereon. The steps can further include training the one or more machine learning models are via any of supervised and unsupervised learning. A first machine learning model can be adapted to determine if the new resource includes inaccurate tags, and a second machine learning model can be adapted to provide tag suggestions based thereon. The first machine learning model can be trained with historical resource data.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method of detecting inaccurate resource tags and providing tag suggestions for inaccurate resource tags in a cloud-native, multi-tenant security platform, the method comprising steps of:

collecting, for a given tenant, tags comprising key-value pairs used for policy enforcement and identification from all resources in a cloud environment associated with the given tenant;

converting each of tag keys of the tags to a desired format comprising a lower-case representation with redundant leading and trailing whitespace removed and extracting unique tag keys in the desired format;

calculating a similarity score between each pair of different ones of all of the unique tag keys in the desired format and creating tag pairs each based on the similarity scores; and selecting a suggested tag key for each of the tag pairs based on a number of appearances of each of the tag keys in the tag pairs in the collected tags for the given tenant, and thereby identifying, for each tag pair, a tag key that is not the suggested tag key as an inaccurate resource tag to be remediated using the suggested tag key, wherein the number of appearances corresponds to a number of times a tag key that normalizes to the tag key in the desired format appears in the cloud environment as a key in the key-value pairs associated with resources of the given tenant, wherein the tag pairs are further created based on the similarity score of a pair exceeding a preconfigured threshold, wherein calculating the similarity score between the pair of different unique tag keys comprises determining matching characters based on longest common substrings between the different unique tag keys and recursively determining matching characters in non-matching regions on either side of the longest common substrings, and discarding pairs for which the similarity score does not exceed the preconfigured threshold, and wherein the steps further comprise providing a visual representation of similarity between all of the collected tags, the providing comprising:

forming a similarity matrix in which rows and columns correspond to respective ones of the unique tag keys and entries in the similarity matrix correspond to similarity scores between pairs of the unique tag keys; and applying a dimensionality-reduction technique to generate, for each unique tag key, a vectorial representation in a two-or three-dimensional space and rendering a scatter plot in which proximity between plotted points corresponds to similarity between the respective unique tag keys.

2. The method of claim 1, wherein creating the visual representation includes calculating a vectorial representation of each tag by applying at least one of Principal Component Analysis (PCA), t-distributed Stochastic Neighbor Embedding (t-SNE), or a neural network to the similarity matrix to derive the vectorial representation of each unique tag key.

3. The method of claim 1, wherein the steps are performed on a per-tenant basis, including repeating the collecting, converting, calculating, creating, selecting, and identifying steps separately for each of a plurality of tenants of the cloud-native, multi-tenant security platform such that inaccurate resource tags and corresponding suggested tag keys are determined independently for each tenant.

4. The method of claim 1, wherein the steps further comprise:

identifying a new resource in the cloud environment for the given tenant; and utilizing one or more trained machine learning models to determine if the new resource has inaccurate tags, and providing tag suggestions based thereon, wherein the one or more trained machine learning models are trained using historical resource data comprising tags and policy responses of other resources in the cloud environment for the given tenant, such that the one or more trained machine learning models (i) determine whether at least one tag associated with the new resource is inaccurate based on learned patterns in the historical resource data and (ii) provide, for each determined inaccurate tag, a tag suggestion corresponding to a suggested tag key.

5. The method of claim 4, wherein the steps further comprise training the one or more machine learning models via any of supervised and unsupervised learning.

6. The method of claim 4, wherein a first machine learning model is adapted to determine if the new resource includes inaccurate tags, and wherein a second machine learning model is adapted to provide tag suggestions based thereon, the method further comprising:

training the first machine learning model with feature vectors derived from historical resource data for resources of the given tenant, the historical resource data comprising tags and corresponding policy behavior information; and training the second machine learning model to output tag suggestions based on suggested tag keys selected according to the method of claim 1 responsive to detection of inaccurate tags by the first machine learning model.

7. The method of claim 6, wherein the first machine learning model is trained with historical resource data comprising, for each of a plurality of existing resources in the cloud environment for the given tenant, tag information comprising key-value pairs associated with the existing resource and policy behavior information indicating how the existing resource responds to one or more security policies enforced by the cloud-native, multi-tenant security platform.

8. A non-transitory computer-readable medium comprising instructions for detecting inaccurate resource tag and providing tag suggestions for inaccurate resource tags in a cloud-native, multi-tenant security platform that, when executed, cause one or more processors to perform steps of:

collecting, for a given tenant, tags comprising key-value pairs used for policy enforcement and identification from all resources in a cloud environment associated with the given tenant;

converting each of tag keys of the tags to a desired format comprising a lower-case representation with redundant leading and trailing whitespace removed and extracting unique tag keys in the desired format;

calculating a similarity score between each pair of different ones of all of the unique tag keys in the desired format and creating tag pairs based on the similarity scores; and selecting a suggested tag key for each of the tag pairs based on a number of appearances of each of the tag keys in the tag pairs in the collected tags for the given tenant, and thereby identifying, for each tag pair, a tag key that is not the suggested tag key as an inaccurate resource tag to be remediated using the suggested tag key, wherein the number of appearances corresponds to a number of times a tag key that normalizes to the tag key in the desired format appears in the cloud environment as a key in the key-value pairs associated with resources of the given tenant, wherein the tag pairs are further created based on the similarity score of a pair exceeding a preconfigured threshold, wherein calculating the similarity score between the pair of different unique tag keys comprises determining matching characters based on longest common substrings between the different unique tag keys and recursively determining matching characters in non-matching regions on either side of the longest common substrings, and discarding pairs for which the similarity score does not exceed the preconfigured threshold, and wherein the steps further comprise providing a visual representation of similarity between all of the collected tags, the providing comprising:

forming a similarity matrix in which rows and columns correspond to respective ones of the unique tag keys and entries in the similarity matrix correspond to similarity scores between pairs of the unique tag keys; and applying a dimensionality-reduction technique to generate, for each unique tag key, a vectorial representation in a two-or three-dimensional space and rendering a scatter plot in which proximity between plotted points corresponds to similarity between the respective unique tag keys.

9. The non-transitory computer-readable medium of claim 8, wherein creating the visual representation includes calculating a vectorial representation of each tag by applying at least one of Principal Component Analysis (PCA), t-distributed Stochastic Neighbor Embedding (t-SNE), or a neural network to the similarity matrix to derive the vectorial representation of each unique tag key.

10. The non-transitory computer-readable medium of claim 8, wherein the steps are performed on a per-tenant basis, including repeating the collecting, converting, calculating, creating, selecting, and identifying steps separately for each of a plurality of tenants of the cloud-native, multi-tenant security platform such that inaccurate resource tags and corresponding suggested tag keys are determined independently for each tenant.

11. The non-transitory computer-readable medium of claim 8, wherein the steps further comprise:

identifying a new resource in the cloud environment for the given tenant; and utilizing one or more trained machine learning models to determine if the new resource has inaccurate tags, and providing tag suggestions based thereon, wherein the one or more trained machine learning models are trained using historical resource data comprising tags and policy responses of other resources in the cloud environment for the given tenant, such that the one or more trained machine learning models (i) determine whether at least one tag associated with the new resource is inaccurate based on learned patterns in the historical resource data and (ii) provide, for each determined inaccurate tag, a tag suggestion corresponding to a suggested tag key.

12. The non-transitory computer-readable medium of claim 11, wherein the steps further comprise training the one or more machine learning models via any of supervised and unsupervised learning.

13. The non-transitory computer-readable medium of claim 11, wherein a first machine learning model is adapted to determine if the new resource includes inaccurate tags, and wherein a second machine learning model is adapted to provide tag suggestions based thereon, the steps further comprising:

training the first machine learning model with feature vectors derived from historical resource data for resources of the given tenant, the historical resource data comprising tags and corresponding policy behavior information; and training the second machine learning model to output tag suggestions based on suggested tag keys selected according to the method of claim 1 responsive to detection of inaccurate tags by the first machine learning model.

14. The non-transitory computer-readable medium of claim 13, wherein the first machine learning model is trained with historical resource data comprising, for each of a plurality of existing resources in the cloud environment for the given tenant, tag information comprising key-value pairs associated with the existing resource and policy behavior information indicating how the existing resource responds to one or more security policies enforced by the cloud-native, multi-tenant security platform.

\* \* \* \* \*